United States Patent [19]

Picone et al.

[11] Patent Number: 4,652,337

[45] Date of Patent: Mar. 24, 1987

[54] VEHICLE IDENTIFICATION SYSTEM

[75] Inventors: Syd Picone; Terrence F. Picone, both of Midland Park, N.J.

[73] Assignee: Armour Products, Midland Park, N.J.

[21] Appl. No.: 757,898

[22] Filed: Jul. 23, 1985

[51] Int. Cl.[4] .......................... B44C 1/22; C03C 15/00; C03C 25/06

[52] U.S. Cl. ............................... 156/654; 101/128.21; 156/655; 156/657; 156/660; 156/661.1; 156/663; 156/240; 156/345

[58] Field of Search ............ 156/654, 655, 657, 659.1, 156/660, 661.1, 663, 240, 241, 345; 101/127, 127.1, 128, 128.1, 128.21, 128.4; 51/310

[56] References Cited

U.S. PATENT DOCUMENTS

| | | | |
|---|---|---|---|
| 3,855,924 | 12/1974 | Morse | 101/127 X |
| 4,316,766 | 2/1982 | Levin et al. | 156/631 |
| 4,319,524 | 3/1982 | Dunham et al. | 101/128 |
| 4,336,754 | 6/1982 | Loeb | 101/127 |
| 4,478,666 | 10/1984 | Ogden | 156/240 |
| 4,563,948 | 1/1986 | Cafferty | 101/128 |

*Primary Examiner*—William A. Powell

*Attorney, Agent, or Firm*—Stefan J. Klauber

[57] ABSTRACT

A kit for facilitating the reproduction of a selected array of alphanumeric characters on a variety of receiving surfaces. The kit contains a set of stencils, with a first stencil having a plurality of cutouts in a desired array and with registration marks at opposite edge portions about the cutouts. A plurality of second stencils, are provided, each of which has a cutout defining an alphanumeric character intermediate the edges of the second stencil, generally corresponding to the size of the cutouts in the first stencil. The cutouts in the second stencils have registration marks about the edge portions thereof. The edge portions of said second stencils can be made to coincide with the edge portions of the cutouts in the first stencil, the registration marks associated with the coinciding edge portions of the first and second stencils serving as indicia to indicate the orientation of the alphanumeric character second stencils to be interconnected with the array of cutouts in the first stencil. Locating a first stencil at a desired location on a receiving surface provides a guide for locating a plurality of selected alphanumeric character stencils on the receiving surface, and then for reproducing the selected array of alphanumeric characters on the receiving surface. Where the receiving surface is the glass window of an automobile, the characters are preferably etched onto the window by means of a glass-etching composition.

19 Claims, 8 Drawing Figures

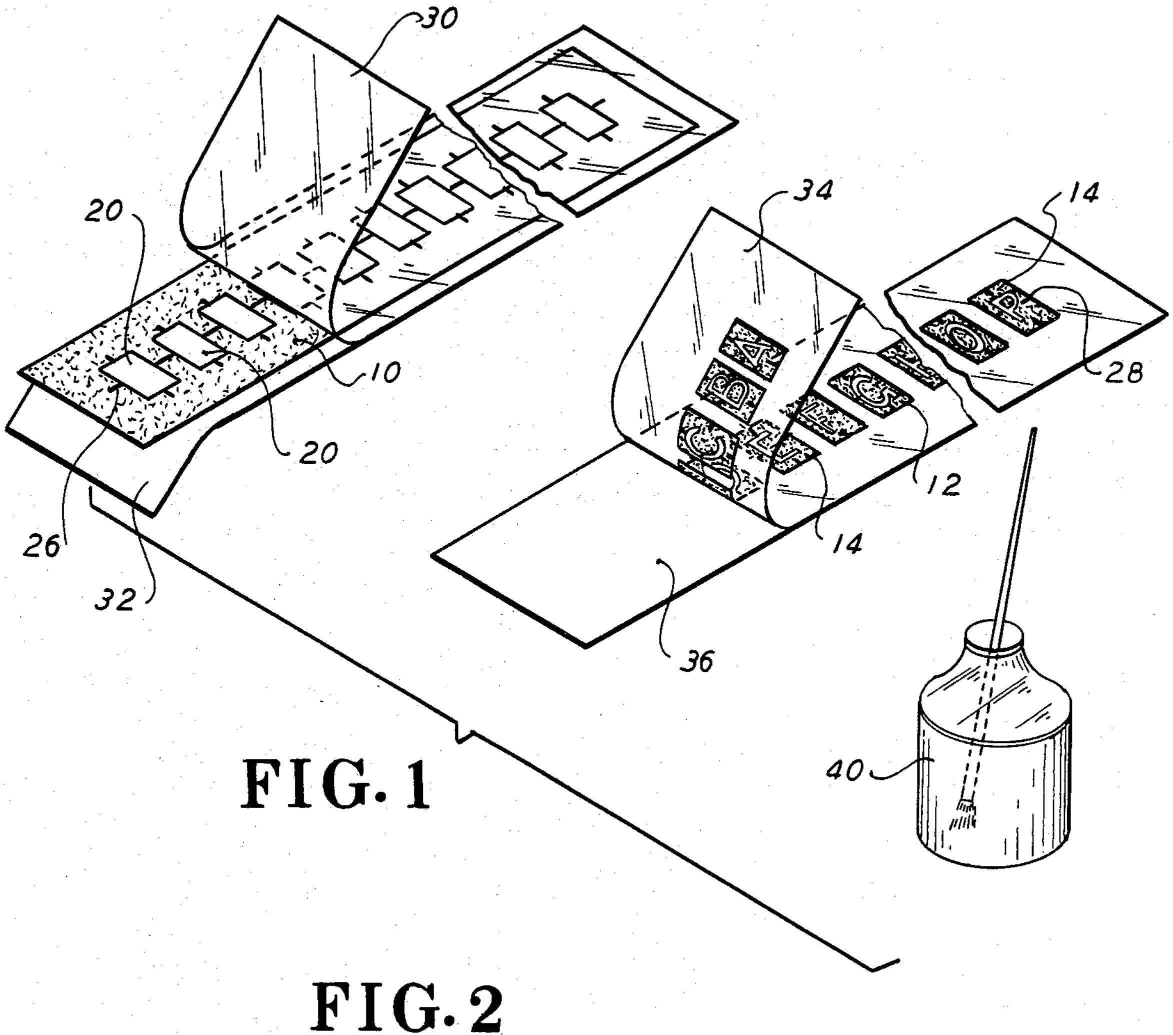
FIG. 1
FIG. 2
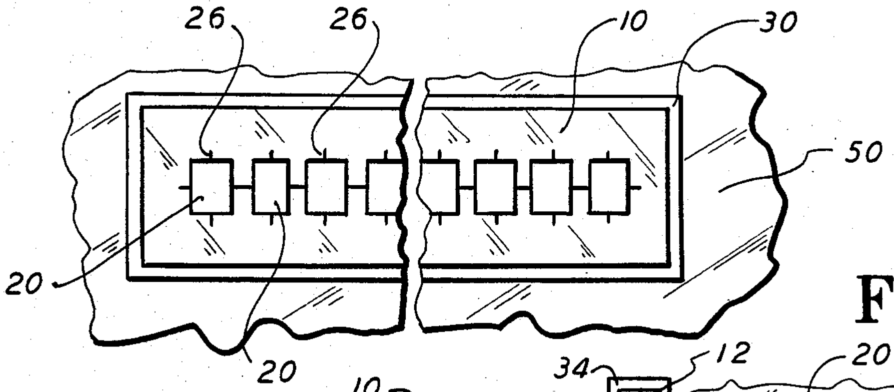
FIG. 3
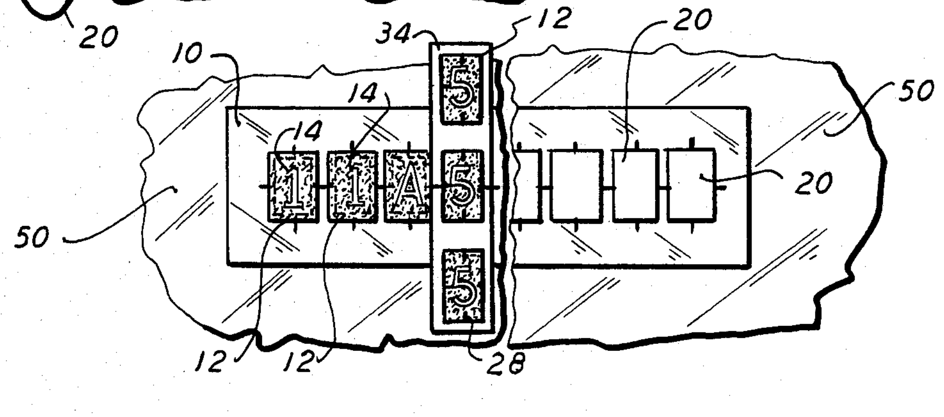

10
20
26
30
12
14
28
34

VEHICLE IDENTIFICATION SYSTEM

FIELD OF THE INVENTION

The present invention relates to automobile identification systems and, more particularly, to a kit containing a guide or stencil designed to facilitate the reproduction of selected alphanumeric characters on a variety of receiving surfaces such as automobile windows.

BACKGROUND OF THE INVENTION

Registration of serial numbers and other indicia of ownership of automobiles, tools, electronic and computer equipment, jewelry and the like items with law enforcement and other governmental agencies has become an increasingly important protection means against theft or other such criminal activities. The prominent location of such permanent identification indicia on the item, where possible, is believed to increase the protection achieved, as well as offering other similar advantages. One such example of the prominent display of selected identification numbers providing added theft protection is to have the vehicle identification number permanently affixed to the glass windows of an automobile.

Heretofore, there existed the problem of applying a uniform array of characters to windows installed in an automobile in prominent but non-obtrusive locations. Application of alphanumeric characters in a regular pattern relative to the structural parts of an automobile is particularly difficult because of the large number of characters required, and the variety of configurations and sizes of the vehicles and the windows installed therein.

Many different lettering guides, stenciling devices and/or templates for printing, lettering or the like are known and have been used commercially over the years such as, for example, disclosed in U.S. Pat. No. 2,693,035 to Beck, U.S. Pat. No. 3,158,940 to Corpening, U.S. Pat. No. 4,262,422 to Pass and U.S. Pat. No. 4,470,197 to Pagalies. To the best of our knowledge, however, all of these known devices can be used only with flat or other regular surfaces, such as sheets of paper, boxes, walls, etc., and/or with conventional marking medium such as ink, paint, etc. Moreover, none of these devices are flexible or small enough to be useful in close, generally obstructed areas and/or with irregular shapes, nor would they be suitable for use with chemical treating compounds to mark by etching or the like for increased permanency of the marking.

Recently, it has been suggested that stencils which are specially prepared with a particular identification number may be used to mark glass surfaces such as automobile windows by treating with a chemical etching material. However, as would be evident, this system can be used to mark only one particular set of characters generally on only one surface and will require fabrication of new stencils for each different set of characters with the attendant inconveniences of lost time and increased cost. Moreover, it would not be known until the specially prepared stencil was fabricated whether it could be used for a particular application.

Accordingly, it would be desirable if a guide system was developed for facilitating the tracing or reproduction of alphanumeric characters which was adaptable for use with a wide range of receiving surfaces as well as being suitable to readily trace or reproduce a large array of characters to, for example, display automobile identification numbers on several of the vehicle windows which are properly oriented with respect to each successive character and to the receiving surface to which it is applied.

It is an object of the present invention to provide a novel guide system for tracing alphanumeric characters on a variety of receiving surfaces wherein a particular combination of stencils may be employed and wherein a plurality of alphanumeric characters are traced or reproduced having a desired orientation with respect to one another and to the receiving surface.

Another object of the invention is to provide a novel kit for producing tracings or reproductions of arrays of specific alphanumeric characters on a variety of receiving surfaces having a desired orientation with respect to each other and to the receiving surface.

Still another object of the invention is to provide a novel stencil set for producing tracings or reproductions of a long array of specific alphanumeric characters on desired locations having irregular shaped receiving surfaces.

A still further object of the invention is to provide a novel kit for permanently providing vehicle identification indicia on the desired location of all the windows of an automobile to provide additional theft protection for said automobile.

Yet still another object of the invention is to provide a guide system for permanently providing tracings or reproductions of a variety of combinations of alphanumeric characters on glass or the like receiving surfaces.

In accordance with the present invention, the foregoing objects, and others as will become apparent in the course of the ensuing specification are achieved by a kit suitable for facilitating the tracing or reproduction of an array of specific alphanumeric characters on a plurality of receiving surfaces. The kit includes a set of stencils, the first of which has a plurality of cutouts, preferably rectangular in shape, in a desired array. Registration marks are provided at opposite edge portions of the cutouts. A plurality of second stencils are provided, each having a cutout defining an alphanumeric character of a size receivable within the area defined by the cutouts in the first stencil, and preferably, corresponding to the size of the cutouts. Registration marks are present about the edge portions of the cutouts in the second stencils. In use, the edge portions of the second stencils coincide with and preferably overlie the edge portions of the cutouts in the first stencil, and the registration mark indicia associated with the coinciding edge portions of the first and second stencils indicate the accurate orientation of the alphanumeric character stencils with respect to the cutouts in the first stencil. This accurate registration enables subsequent use of the stencils in forming the alphanumerics upon the receiving surfaces, e.g., an automobile window.

Preferably, one or more of the first stencils are supported by and releasably adherent to a flexible, transparent plastic support panel, which can also serve as a template for locating the first stencil on a receiving surface. The plurality of alphanumeric character second stencils are also preferably supported on a flexible, transparent plastic support panel which can assist in their handling and placement. The support panel plays an important role in locating and aligning the registration mark indicia of the desired alphanumeric character second stencils with the appropriate cutouts in the first stencil and then in transferring the alphanumeric character stencils to the first stencil in the specific array to be reproduced. In accordance with the present invention, it has been found that the novel kit of the present invention and the novel combination of stencils provided therewith, surprisingly enables the ready alignment of a plurality of specific alphanumeric character stencils in a desired array on a wide variety of receiving surfaces, such as the surfaces of installed automobile windows, thus making possible the tracing or reproduction of the array of characters on the receiving surface at a desired location. To provide for the permanent marking of the window surfaces such as would be required for vehicle identification numbers to serve in theft protection applications, suitable chemical glass or the like etching compounds may be provided with the novel kit of the invention, the stencil materials of the invention being compatible therewith.

There is also provided, in accordance with the present invention, a method for permanently providing an identification number on the glass window surfaces of an automobile which comprises the steps of:

a. providing a first stencil having an array of cutouts with registration marks at opposite edge portions of each of the cutouts and locating the stencil at a desired location on an automobile window surface;

b. providing a plurality of second stencils having cutouts defining selected alphanumeric characters substantially the size of the cutouts in the first stencil, and having opposite edge portions thereof with registration marks which coincide with and preferably overlie the registration mark indicia associated with the edge portions of the cutouts in the first stencil and depositing the second stencils in the desired cutouts in the array of cutouts in the first stencil; and c. treating the combination of stencils deposited on an automobile window surface with a means for reproducing the alphanumeric characters defined by the second stencils on the glass receiving surface of the automobile window.

It has been found that in accordance with the method of the invention, essentially unlimited combinations of alphanumercial characters including vehicle registration numbers can be readily and permanently applied to a desired location on a variety of receiving surfaces such as automobile windows. The method permits a selected array of alphanumeric characters to be applied at a desired location, the display achieved thereby being readily discernible and not aesthetically undesirable, and the presence thereof affording the automobile owners an additional degree of protection against theft.

BRIEF DESCRIPTION OF THE DRAWINGS

The above and other features of my invention will now be described in detail with reference to the accompanying drawings, in which:

FIG. 1 is a perspective view of the first and second stencil components of the kit of the present invention;

FIG. 2 is a plan view, partially broken away, of a first stencil shown in FIG. 1, illustrating the use thereof in accordance with the present invention;

FIG. 3 is a plan view, partially broken away, of a plurality of alphanumeric stencils (second stencils) shown in FIG. 1, illustrating in conjuntion with FIG. 2 the use thereof in accordance with the present invention;

DESCRIPTION OF PREFERRED EMBODIMENT

Figures 1A, 1B, 1C:
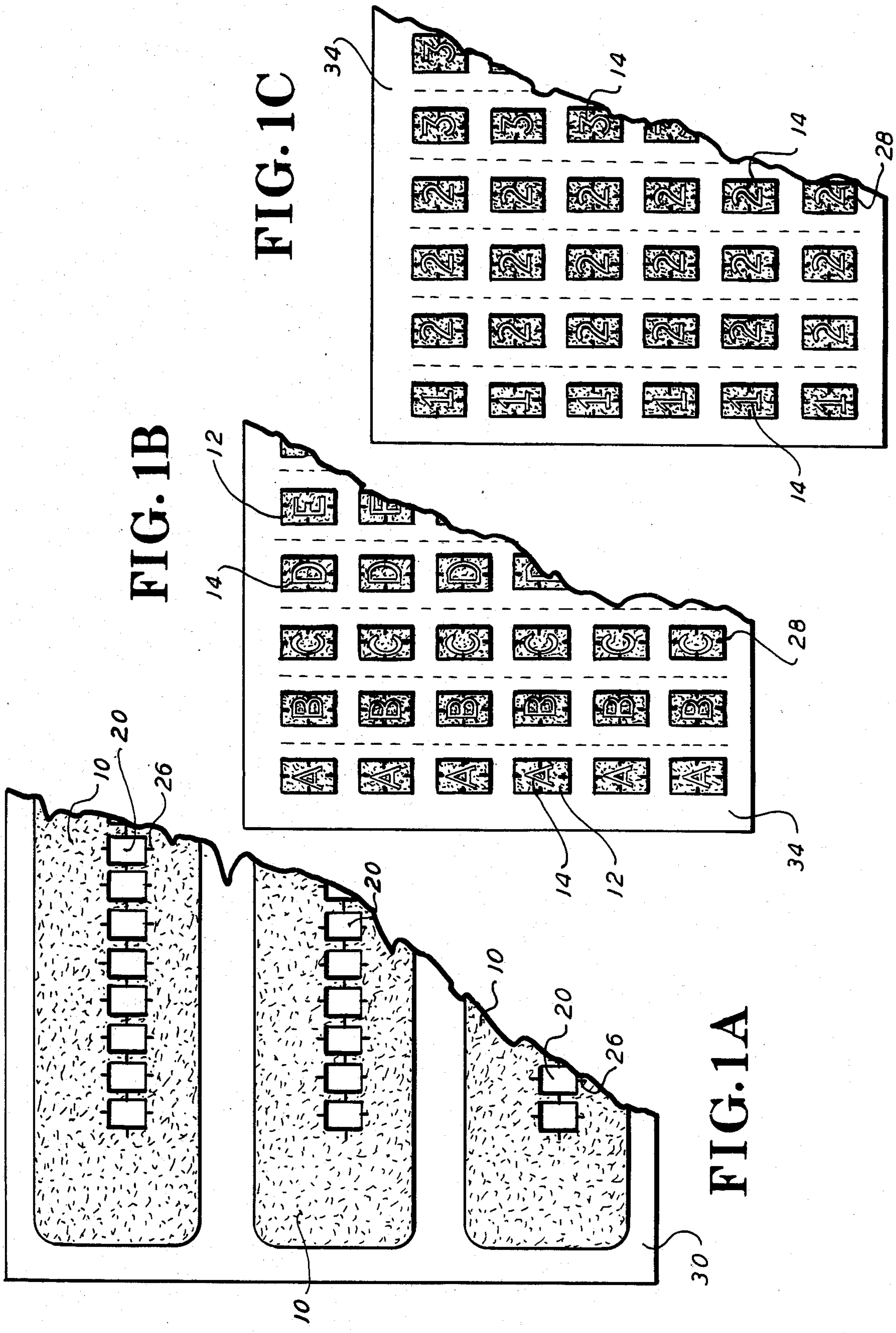
FIG. 1A is a plan view, partially broken away, of the first stencil components of the kit of the present invention supported on a flexible transparent panel in accordance with the invention.
FIGS. 1B and 1C is a plan view, partially broken away, of a plurality of second stencil components of the kit of the present invention supported on a flexible transparent panel in accordance with the invention.

Referring now to the drawings, wherein like reference numerals denote like parts, there is shown in FIGS. 1, 1A, 1B and 1C the novel stencil set of the kit of the invention, which comprises a first stencil which in the illustrated embodiment (FIG. 1A) contains three in number, identified by the numeral 10, and a plurality of second stencils identified by the numeral 12.

The first stencil contains a plurality of cutouts 20 which are rectangular in shape, with each of the cutouts being of substantially equal size. The cutouts 20 are arranged in a desired array and there are disposed along the edge portions about each of the cutouts, registration marks 26, with the registration marks at opposite edge portions of each cutout being in substantial alignment. The particular number of cutouts 20 in the stencil will, of course, depend on the number of characters in the identification number to be traced or reproduced, the size and location of the receiving surface, the size of the characters to be traced or reproduced, and other like considerations.

The first stencil 10 is formed of a unitary sheet of thin, flexible plastic material and preferably, an extremely thin film of a vinyl resin material which is self-adhering. Generally, the stencil 10 is releasably adherent to other flexible plastic materials to permit the use thereof as a carrier support for said stencil from which the stencil can be safely transferred to a receiving surface without damage or displacement.

As illustrated in FIG. 1 and FIG. 1A, the first stencil 10 is supported on a flexible, generally transparent plastic panel or sheet 30 to which the stencil is releasably adherent. The stencil 10 is preferably sandwiched between the transparent support panel 30 and a sheet of paper 32 which is generally non-adherent or releasably adherent to the surface of the stencil 10 and the plastic support panel 30. One or more of said first stencils can be supported on said plastic support panel 30 and sandwiched between said panel 30 and paper 32.

The second stencils of the stencil set of the invention comprise a plurality of small rectangular stencils 12 having cutouts defining various alphanumeric characters 14 intermediate the edges of each stencil 12. The alphanumeric character cutouts in said second stencil(s) can generally be of any size receivable within the area of the cutouts 20 in said first stencil 10 and, preferably, corresponds to the size thereof. About the edge portions of each of said second stencils 12 are located registration marks 28. The registration marks 28 at opposite edge portions of each of the second stencils 12 are in substantial alignment and the registration marks 28 in the second (third, fourth, etc.) stencils 12 coincide with and preferably overlie the registration marks 26 located about the cutouts in the first stencil 10.

Each of the second stencils 12 is formed of a sheet of flexible plastic material of the type used in preparing the first stencil, though it is not necessary that they be prepared from the same plastic material. Preferably each of the stencils 12 are prepared from an extremely thin film of vinyl resin material which is self-adherent and adherent to the material used in the first stencil 10.

As illustrated in FIGS. 1, 1B and 1C the second stencils 12 of the stencil set comprise a plurality of alphanumeric character stencils 14 which are supported on a flexible, generally transparent plastic material 34 to which the stencils 12 are releasably adherent. Preferably, such second stencils 12 are sandwiched between said plastic support material 34 and a sheet of paper 36 with surface release characteristics.

As indicated, the kit of the invention may also include a means for tracing or reproducing alphanumeric characters on the receiving surface. In a preferred embodiment, the kit illustrated in the drawing includes a chemical treating compound 40 for permanently reproducing alphanumeric characters defined by the stencil set on the receiving surface. In the case of the receiving surface being glass such as in the windows of an automobile, any known glass etching composition such as mixtures of sodium and ammonium bifluorides, together with fillers, modifiers and the like would be included. The kit may also include brush means for applying the chemical treating compounds to the surface of the stencils, as well as rollers or wood tongue depressors or the like, for applying mild pressure to the surfaces of the stencils, stencil support panels, etc.

Referring now to FIGS. 2 to 5, there is illustrated a method of tracing or reproducing an array of selected alphanumeric characters to a glass receiving surface in accordance with the practice of the invention. In the specific embodiment illustrated, an automobile identification number is permanently reproduced on the outside surface of a glass window installed in the vehicle, although it would be evident that, if desired, the identification could be placed on the inside surface of the window.

In FIG. 2, there is illustrated the locating of a first stencil 10 supported on a transparent panel 30 onto the glass window surface 50. The first stencil 10 is cut from a supported sheet thereof(illustrated in FIG. 1). An edge of the support panel 30 serves as a template for locating the first stencil on the window surface relative to the automobile structure. With the backing sheet 32 removed, the first stencil 10 supported on panel 30 is placed on the cleaned surface of the automobile window 50 at its desired location. Using a roller, wood tongue depressor or the like (not shown), light pressure is applied to the top surface of the stencil support panel 30 to effect adhesion and transfer of the first stencil 10 to the glass receiving surface 50 taking care not to distort or dislocate the positioning of the stencil. The plastic support panel 30 can then be removed from the window surface without removing or damaging the first stencil 10, and discarded.

A desired second stencil 12 defining a selected alphanumeric character 14 is then provided by cutting one or more of such second stencils 12 from a sheet thereof (as illustrated in FIGS. 1B and 1C) sandwiched between the plastic support panel 34 and the paper backing 36. In FIG. 3 there is illustrated positioning of the selected second stencil 12, with the paper backing sheet 36 discarded, over a selected cutout 20 in the first stencil 10 in a predetermined relationship to the identification number to be reproduced on the window surface 50. The flexible, transparent support panel 34 provides means for handling the selected second stencil 12 so that it can be properly positioned over a selected cutout 20 in the first stencil 10. The registration mark indicia 28 about the alphanumeric character cutout 14 in the second stencil 12, and the coinciding registration mark indicia 26 about the edge portions of the associated cutouts 20 in the first stencil 10, are used as an indexing guide for properly orienting the second stencil 12 over the selected cutout in the first stencil 10. With the selected second stencils 12 properly positioned over the selected cutouts 20 in the first stencil 10, light pressure is applied to the top surface of the support panel 34 to insure adhesion of the second stencils 12 to the underlying first stencil 10 and the automobile window surface 50. The support panel 34 is then removed from the window surface, taking care not to damage or dislocate the stencil 12. In the practice of the invention, the second stencils 12 are employed individually in any desired sequence until the array of stencils 12 defining the characters required to reproduce the vehicle identification number 52 is positioned over the surface of the window 50. The array of cutouts 20 in the first stencil 10 and the registration mark indicia in first stencil and second stencils have been provided so that each of the selected second stencils 12 can be located in an aligned, properly oriented array on the automobile window 50 receiving surface. When all of the second stencils 12 have been properly positioned on the automobile window 50, the selected identification number 52 is then reproduced on the window surface 50.

Figure 4:
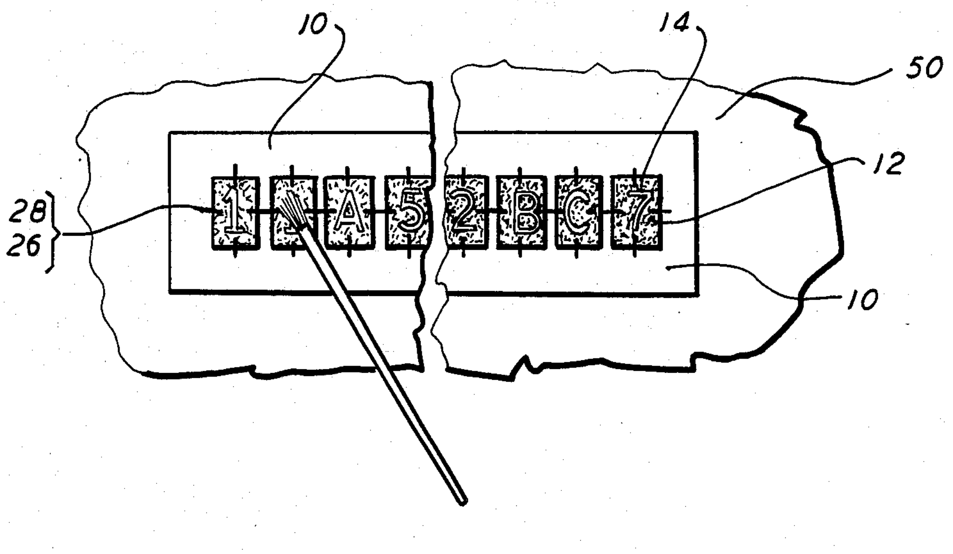
FIG. 4 is a plan view, partially broken away, illustrating in conjunction with FIGS. 2 and 3 the method of the present invention.

Referring now to FIG. 4, a glass etching composition 40 in the form of a paste is applied over the surface of the stencils using a brush or other suitable means. After an appropriate period of time (generally from about 30 seconds to 5 minutes), the treatment of the window 50 is sufficient to permanently reproduce by etching of the glass the characters defined by the cutouts 14 in the second stencils 12. The material from which the stencils are formed is not attacked by the chemical etching compound and adhesion of the stencils 10, 12 to the glass surface prevents the etching compound from reacting with any portion of the glass surface covered by the stencils. Careful removal of all of the etching compound by washing with water, etc., will then terminate further etching of the glass.

Figure 5:
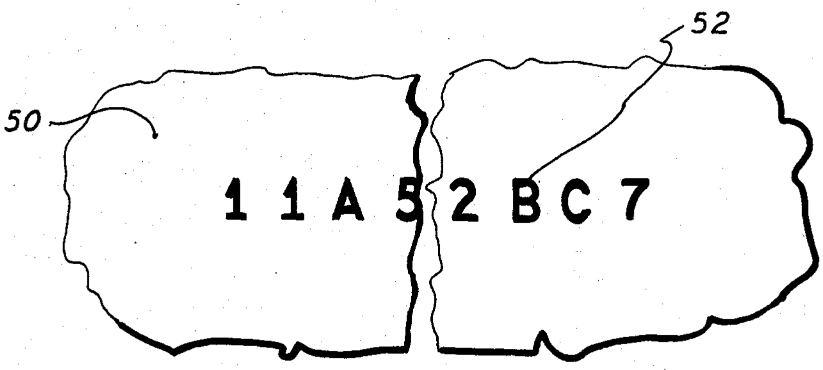
FIG. 5 is a plan view, partially broken away, illustrating an automobile identification number reproduced on a window receiving surface.

Referring now to FIG. 5, there is illustrated the automobile window 50 shown in FIGS. 2 to 4 with the stencils removed and the identification number 52 of the vehicle permanently reproduced on the surface thereof. As described above, generally all the windows of the automobile are treated with the vehicle identification number so that any deviation in the appearance of the numbers or differences in the numbers would raise suspicion of auto theft. Prominent location of the vehicle identification number also makes possible the ready determination of ownership.

It can be seen that utilization of the novel stencil set and kit of the invention in accordance with the practice of the invention permits a great variety of arrays of alphanumeric character representations to be readily produced on many receiving surfaces with a minimum of skill or effort. It will further be evident that the novel stencil set and kit of the invention can be utilized with other marking or coating media or the like, i.e. if etched characters are not desired, paints, inks or the like may be readily used with the stencil elements once the selected array of character stencils has been properly positioned.

Having thus described the invention with reference to a specific embodiment, other modifications will be apparent to those skilled in the art without departing from the scope of the invention which is defined in the following claims.

What is claimed is:

1. A kit for facilitating the reproducing of a selected array of alphanumeric characters on a receiving surface comprising:

a stencil set containing:

(a) a first stencil capable of adhering to said surface and having a plurality of cutouts in a desired array and with registration marks at opposite edge portions about said cutouts; and (b) a plurality of second stencils, each of which is capable of adhering to said surface and has a cutout defining an alphanumeric character intermediate the edges of said second stencil of a size receivable within the area defined by the cutouts in said first stencil, with registration marks about the edge portions thereof, the edge portions of said second stencils coinciding with the edge portions of the cutouts in said first stencil and the registration marks associated with the coinciding edge portions of said first and second stencils serving as indicia to indicate the orientation of said alphanumeric character second stencils to be interconnected with said array of cutouts in said first stencil.

2. A kit according to claim 1 wherein said first and second stencils each comprise a thin film of vinyl resin material.

3. A kit according to claim 1 which includes a chemical treating composition for permanently reproducing on a receiving surface an array of alphanumeric characters defined by the interconnection of said first and second stencils on said receiving surface.

4. A kit according to claim 1 wherein said first stencil is releasably adhered to a flexible transparent support material.

5. A kit according to claim 4 wherein said support material is a template for locating said first stencil on a receiving surface.

6. A kit according to claim 4 wherein said first stencil is sandwiched between said support material and a backing sheet.

7. A kit according to claim 1 wherein a plurality of said first stencils are releasably adhered to a flexible transparent support material.

8. A kit according to claim 4 wherein said second stencils are releasably adhered to a flexible transparent support material.

9. A kit according to claim 6 wherein said second stencils are sandwiched between a flexible transparent support material and a backing sheet.

10. A kit according to claim 3 which includes means for applying said chemical treating composition, and pressure means for transferring said first and second stencils to a receiving surface without damage to said stencils.

11. A method for permanently providing an identification number on the glass window surface of an automobile which comprises the steps of:

(a) providing a first stencil having an array of cutouts with registration marks at opposite edge portions of each of said cutouts, and locating said stencil at a desired location on an automobile window surface; said first stencil being caused to adhere to said surface;

(b) providing a plurality of second stencils having cutouts defining selected alphanumeric characters substantially the size of the cutouts in said first stencil, with registration marks on opposite edge portions thereof which coincide with the registration marks about the edge portions of the cutouts in said first stencil, and depositing selected second stencils in selected cutouts in said first stencil located on said automobile window surface, with the registration mark indicia about the associated edged portions of said second stencils, and cutouts of said first stencil serving to index the orientation and location of said second stencils; said second stencils being caused to adhere to said surface; and (c) treating said interconnected combination of stencils deposited on an automobile window surface with means for reproducing said selected array of alphanumeric characters on said automobile window surface.

12. A method according to claim 11 wherein said first stencil in supported on a transparent plastic support panel.

13. A method according to claim 12 wherein said second stencils are supported on a transparent plastic support panel.

14. A method according to claim 12 wherein said first stencil is releasably adherent to the surface of said plastic support panel, and said first stencil is located on an automobile window surface by locating said plastic support panel on said window surface with said first stencil overlying the window surface, and transferring the stencil to said window surface.

15. A method according to claim 14 wherein said plastic support panel is removed from said window surface.

16. A method according to claim 13 wherein said second stencils are releasably adherent to a surface of the transparent support panel.

17. A method according to claim 16 wherein selected second stencils are deposited in selected cutouts in said first stencil, with edge portions of said second stencils overlying edge portions about the cutouts in said first stencil, and transferring said second stencils from said support panel to said first stencil and to the window surface.

18. A method according to claim 17 wherein said second stencil support panel is removed from the surface of said stencil.

19. A method according to claim 18 wherein said treating means for reproducing said alphanumeric characters is a glass etching composition.

* * * * *